United States Patent
Kumar et al.

(10) Patent No.: US 11,842,159 B1
(45) Date of Patent: Dec. 12, 2023

(54) INTERPRETING A TEXT CLASSIFIER

(71) Applicant: Amazon Technologies, Inc., Seattle, WA (US)

(72) Inventors: Sawan Kumar, Bangalore (IN); Kalpit Dixit, Mountain View, CA (US); Syed Kashif Hussain Shah, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 17/203,495

(22) Filed: Mar. 16, 2021

(51) Int. Cl.
 *G06F 40/30* (2020.01)
 *G06F 40/242* (2020.01)
 *G06F 40/284* (2020.01)

(52) U.S. Cl.
 CPC ............ *G06F 40/30* (2020.01); *G06F 40/242* (2020.01); *G06F 40/284* (2020.01)

(58) Field of Classification Search
 CPC ....... G06F 40/30; G06F 40/242; G06F 40/284
 See application file for complete search history.

(56) References Cited

U.S. PATENT DOCUMENTS

| | | | | |
|---|---|---|---|---|
| 2016/0253313 | A1* | 9/2016 | Breske | G06F 40/242 704/10 |
| 2020/0097586 | A1* | 3/2020 | Balik | G06F 40/103 |
| 2020/0210817 | A1* | 7/2020 | Chatterjee | G06N 3/044 |
| 2021/0103775 | A1* | 4/2021 | Glass | G06F 40/284 |
| 2021/0183484 | A1* | 6/2021 | Shaib | G06F 40/295 |
| 2021/0216762 | A1* | 7/2021 | Brooks | G06F 40/30 |
| 2021/0303786 | A1* | 9/2021 | Veyseh | G06N 3/084 |
| 2022/0129794 | A1* | 4/2022 | McGrath | G06F 16/2379 |
| 2022/0198144 | A1* | 6/2022 | Yang | G06N 3/088 |
| 2022/0198254 | A1* | 6/2022 | Dalli | G06N 3/088 |
| 2022/0269864 | A1* | 8/2022 | Xue | G06F 40/279 |
| 2022/0383134 | A1* | 12/2022 | Ghosh | G06N 5/045 |
| 2022/0398857 | A1* | 12/2022 | Fleming | G06F 18/2413 |

FOREIGN PATENT DOCUMENTS

CN 110765733 A * 2/2020

OTHER PUBLICATIONS

Bird, Steven et al. 2009. Natural language processing with Python: analyzing text with the natural language toolkit. O'Reilly Media, Inc.

(Continued)

*Primary Examiner* — Bhavesh M Mehta
*Assistant Examiner* — Philip H Lam
(74) *Attorney, Agent, or Firm* — Nicholson De Vos Webster & Elliott LLP (57) ABSTRACT

Techniques for interpreting a text classifier model are described. An exemplary method includes receiving a request to interpret the text classifier; receiving input text to be used to interpret the text classifier; interpreting the text classifier using the input text and masked input text to determine two or more of a counterfactual score for the received input text or an aspect thereof, an importance score for the received input text or an aspect thereof, and a bias score for the received input text or an aspect thereof as requested by the request, and providing the determined one or more scores is provided to a requester.

20 Claims, 8 Drawing Sheets

(56) References Cited

OTHER PUBLICATIONS

Chen, Hanjie et al. 2020. Generating hierarchical explanations on text classification via feature interaction detection. In Proceedings of the 58th Annual Meeting of the Association for Computational Linguistics, pp. 5578-5593, Online. Association for Computational Linguistics.

Conneau, Alexis et al. 2019. Unsupervised cross-lingual representation learning at scale. arXiv preprint arXiv:1911.02116.

Devlin, Jacob et al. 2019. BERT: Pre-training of deep bidirectional transformers for language understanding. In Proceedings of the 2019 Conference of the North American Chapter of the Association for Computational Linguistics: Human Language Technologies, vol. 1 (Long and Short Papers), pp. 4171-4186, Minneapolis, Minnesota. Association for Computational Linguistics.

Ghorbani, Amirata et al. 2019. Interpretation of neural networks is fragile. In Proceedings of the AAAI Conference on Artificial Intelligence, vol. 33, pp. 3681-3688.

Han, Xiaochuang et al. 2020. Explaining black box predictions and unveiling data artifacts through influence functions. In Proceedings of the 58th Annual Meeting of the Association for Computational Linguistics, pp. 5553-5563, Online. Association for Computational Linguistics.

Jacovi, Alon and Yoav Goldberg. 2020. Towards faithfully interpretable NLP systems: How should we define and evaluate faithfulness? In Proceedings of the 58th Annual Meeting of the Association for Computational Linguistics, pp. 4198-4205, Online. Association for Computational Linguistics.

Kitaev, Nikita and Dan Klein. 2018. Constituency parsing with a self-attentive encoder. In Proceedings of the 56th Annual Meeting of the Association for Computational Linguistics (vol. 1: Long Papers), pp. 2676-2686, Melbourne, Australia. Association for Computational Linguistics.

Lipton, Zachary C. 2018. The mythos of model interpretability. Queue, 16(3):31-57.

Liu, Yinhan et al. 2019. Roberta: A robustly optimized bert pretraining approach. arXiv preprint arXiv:1907.11692.

Oshchilov, Ilya and Frank Hutter. 2018. Decoupled weight decay regularization. In International Conference on Learning Representations.

Murdoch, W. James et al. 2018. Beyond word importance: Contextual decomposition to extract interactions from lstms. In International Conference on Learning Representations.

Raffel, Colin et al. 2019. Exploring the limits of transfer learning with a unified text-to-text transformer. arXiv preprint arXiv:1910.10683.

Ribeiro, Marco Tulio et al. 2016. "why should i trust you?" explaining the predictions of any classifier. In Proceedings of the 22nd ACM SIGKDD international conference on knowledge discovery and data mining, pp. 1135-1144.

Socher, Richard et al. 2013. Recursive deep models for semantic compositionality over a sentiment treebank. In Proceedings of the 2013 Conference on Empirical Methods in Natural Language Processing, pp. 1631-1642, Seattle, Washington, USA. Association for Computational Linguistics.

Wallace, Eric et al. 2018. Interpreting neural networks with nearest neighbors. In Proceedings of the 2018 EMNLP Workshop BlackboxNLP: Analyzing and Interpreting Neural Networks for NLP, pp. 136-144, Brussels, Belgium. Association for Computational Linguistics.

Wallace, Eric et al. 2019. AllenNLP interpret: A framework for explaining predictions of NLP models. In Proceedings of the 2019 Conference on Empirical Methods in Natural Language Processing and the 9th International Joint Conference on Natural Language Processing (EMNLP-IJCNLP): System Demonstrations, pp. 7-12, Hong Kong, China. Association for Computational Linguistics.

Wang, Alex et al. 2018. Glue: A multi-task benchmark and analysis platform for natural language understanding. In International Conference on Learning Representations.

Wiegreffe, Sarah and Yuval Pinter. 2019. Attention is not not explanation. arXiv preprint arXiv:1908.04626.

Wolf, Thomas et al. 2019. Huggingface's transformers: State-of-the-art natural language processing. ArXiv, abs/1910.03771. Teven Le Scao, Sylvain Gugger, Mariama Drame.

* cited by examiner

FIG. 1

| | |
|---|---|
| INPUT TEXT: | "THE LOCAL SPORTS TEAM COULDN'T WIN IF THEY WERE SPOTTED 10 POINTS AND THE OTHER TEAM DIDN'T SHOW UP" |
| MODEL PREDICTION: | NEGATIVE SENTIMENT |

— 201

| | |
|---|---|
| QUERY 1: | WHICH WORDS HAD THE MOST INFLUENCE TOWARD THE PREDICTION? |
| ANSWER 1: | THE WORD "COULDN'T" HAS THE HIGHEST NEGATIVE INFLUENCE |

— 203

| | |
|---|---|
| QUERY 2: | WHICH WORDS WOULD HAVE MADE THE PREDICTION POSITIVE? |
| ANSWER 2: | REPLACING "COULDN'T" WITH "COULD" AND/OR "DIDN'T" WITH "DID" |

— 205

| | |
|---|---|
| QUERY 3: | IS THERE A GENERAL BIAS AGAINST "PURPLE EYES" // BIAS AGAINST HUMAN TRAIT SOCIAL GROUP, IDEA, GENDER |
| ANSWER 3: | YES, THERE ARE MANY CONTEXTS WHERE THE MODEL PREDICTS NEGATIVE SENTIMENT FOR "PURPLE EYES" // BIAS IN GENERAL (DATASET LEVEL) |

INTERPRETING A TEXT CLASSIFIER

BACKGROUND

Text classification systems built using deep neural network models have increasingly shown to be more successful than other methods. This, however, has come at the cost of the neural networks becoming larger and more opaque. For end-user applications as well as for developers, understanding or interpreting why a text classification system produces a certain output for a given input can be important.

Existing approaches for providing post-hoc interpretation of such models tend to provide importance scores for parts of the input, such as words, without providing a clear recipe for any further interaction with the user. It is hard for a user to build trust on such methods easily. Typical existing approaches rely on some sort of a heuristic without a clear testable hypothesis and often their behavior depends on the input they are trying to interpret.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for interpreting text classification models. One important goal is to design an interpretation scheme which lets the end user interact with the system which needs interpretation, beyond being presented with some scores on parts of the input. A user may want to know how a part of the input would behave in other contexts, and also how other parts would behave in its place. Being able to make such queries and getting answers to the same in a reasonable time would help a user understand the system, be able to build trust in it, and also uncover any undesired biases it might have learned.

Several existing approaches rely on some heuristic to come up with importance scores, such as gradients, attentions, or locally valid classifiers. Detailed herein are embodiments which identify a global learning objective which, when learned, enables the prediction of importance scores. Additionally, interpretation method does not produce importance scores alone, but produces one or more types of scores to enable a user to explore and understand model behavior, potentially over large datasets.

In particular, embodiments detailed herein allow for a text classifier to be interpreted to answer one or more questions. A first question is "what words of a given text input are important"? For example, which parts of the input text were most influential for the prediction? To answer this question, importance scores are generated. Such importance scores, popular in existing approaches, can provide useful insights but are hard to evaluate.

A second question is "can the model predict counterfactuals"? Counterfactuals are words or phrases that can be used in place of one more words or phrases (minimal changes) of the input text while causing the model to change its decision. Such predictions can be revealing but easy to test. Counterfactual scores provide insights into model behavior across a potentially large vocabulary of words.

A third question is "is the model biased against certain words"? One way to provide an answer to such a question is to evaluate a large number of contexts, replacing a word in the original context with different words. Doing that however is prohibitive with large text classification models. Embodiments herein generate bias scores for words and/or phrases across a number of contexts.

Figure 1:
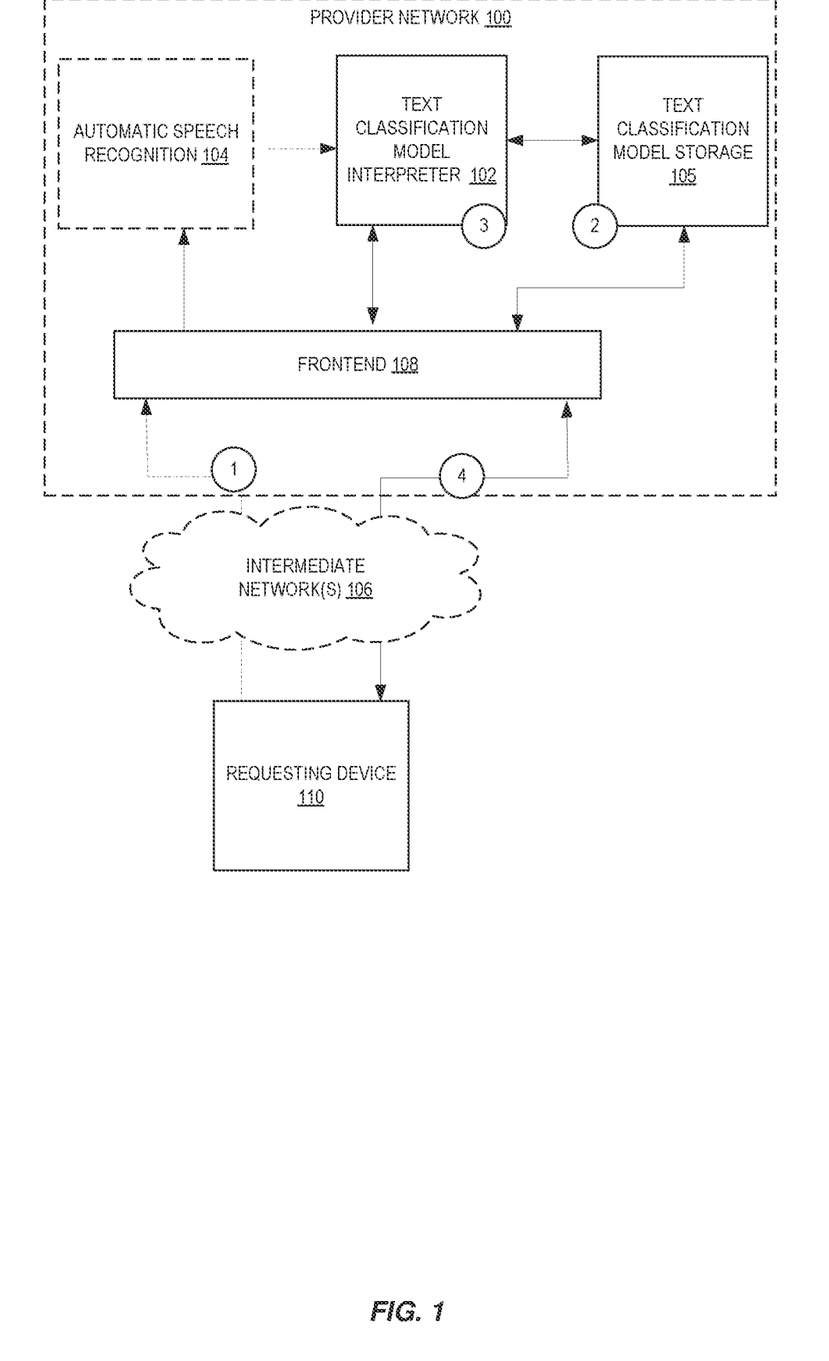
FIG. 1 illustrates embodiments that utilize a text classification model interpreter.

FIG. 1 illustrates embodiments that utilize a text classification model interpreter. In particular, a text classification model interpreter 102 is used to interpret a model from text classification storage 105. The text classification model interpreter 102 interprets the behavior of the model and answers one or more of the above questions by providing scores which can then be presented (possibly in modified form) to a user at a requesting device 110.

In some embodiments, when the text classification model interpreter 102 is a part of a provider network 100, a frontend or orchestrator 108 receives requests to perform interpretations of a model and kicks off the interpretation process which may include one or more of retrieving the model from storage 105, configuring the text classification model interpreter 102 according to the request, invoking the configured text classification model interpreter 102, interpreting results (e.g., scores) of the invoked text classification model interpreter 102, and providing the interpreted results and/or scores to the requester. In some embodiments, an automatic speech recognition component or service 104 generates text from audio to be used in the model interpretation process. In some embodiments, the text classification model interpreter 102 is invoked on a graphics processing unit.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Circles with numbers inside indicate an exemplary flow of actions. Circle 1 is indicative of a request being made by a requesting device 110 for the text classification model interpreter 102 to evaluate a model stored in the text classification model storage 105.

The frontend 108 causes the model to be interpreted to be given to the text classification model interpreter 102 at circle 2. The text classification model interpreter 102 then evaluates the model using input text provided by the request (or indicated by the request) and generates one or more scores at circle 3.

At circle 4, the frontend 108 returns those scores (as scores and/or transformed into a more user friendly (e.g., textual) explanation). In some embodiments, a graphical user interface (GUI) provides the results of the interpretation.

Figure 2:
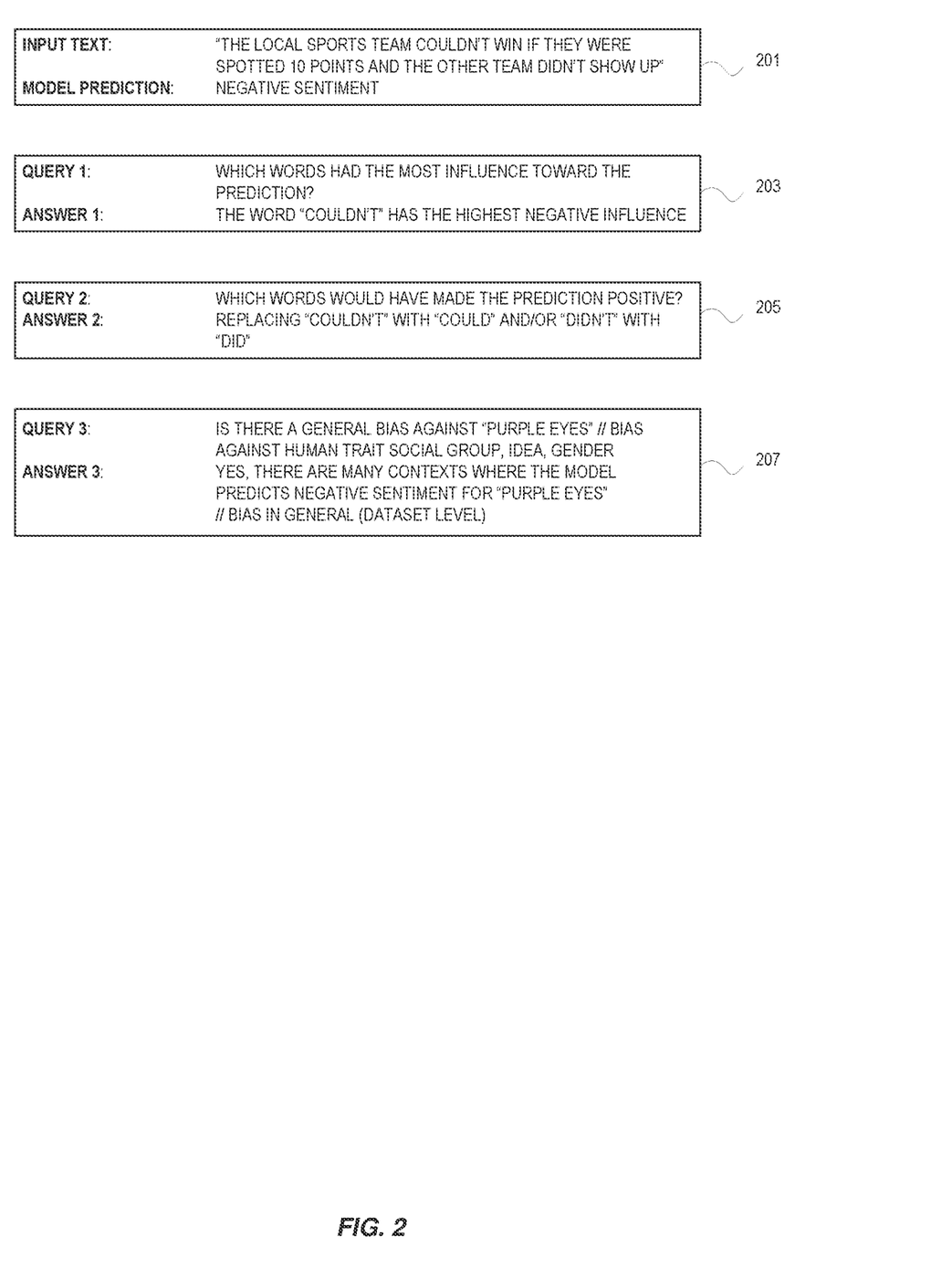
FIG. 2 illustrates examples of input text and interpretations of an output of a model classifying that text.

FIG. 2 illustrates examples of input text and interpretations of an output of a model classifying that text. Box 201 shows exemplary input text and a prediction (classification) from a model. In particular, the input text is predicted (labeled or classified) as being indicative of a negative sentiment.

One may want to know what words of that text the model found to be negative. Box 203 shows an exemplary query and the answer provided by the text classification model interpreter 102. In particular, that the word "couldn't" had the highest negative influence. Note that responses to this query could include influence scores for each of the words, influence scores for the most influential words (either positive or negative), etc. This query may be in the form of a separate request than a request to configure the text classification model interpreter 102, or may be a default act in response to requesting interpretation of a model.

One may want to know what words of that text could change the classification (be a counterfactual). Box 205 shows an exemplary query and the answer provided by the text classification model interpreter 102. In particular, that replace the word "couldn't" with "could" or "didn't" with "did" could change the classification. Note that responses to this query could include counterfactual scores for each of the words, counterfactual scores for the most influential words (either positive or negative), etc. This query may be in the form of a separate request than a request to configure the text classification model interpreter 102, or may be a default act in response to requesting interpretation of a model.

One may want to know what words of that text the model has a bias against. Box 207 shows an exemplary query and the answer provided by the text classification model interpreter 102. In particular, is there a general bias against a human traint, social group, idea, gender, etc. Note that responses to this query could include bias scores for each of the words, influence scores for the most bias words (either positive or negative), etc. This query may be in the form of a separate request than a request to configure the text classification model interpreter 102, or may be a default act in response to requesting interpretation of a model. Additionally, biases at a dataset level may be determined.

Figure 3:
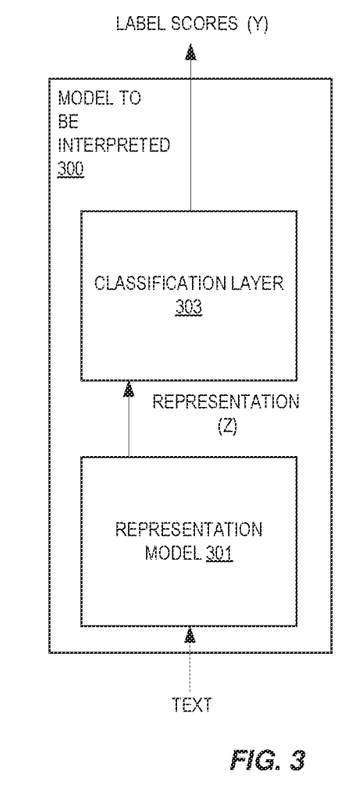
FIG. 3 illustrates embodiments of a model to be interpreted.

FIG. 3 illustrates embodiments of a model to be interpreted. As shown, the model to be interpreted 300 includes a representation model 301 which generates a representation (z) of input text (x) such that z=M(x). The representation (z) is fed to a classifier (or classification layer) 303 which generates label scores (y=C(z)) for the text input (x). In this illustration (and others), x denotes a text sequence $x_1 x_2 \ldots x_n$. A label prediction is obtained as the label with the highest score (1=argmax(y)).

In some embodiments, the representation model 301 is a Bidirectional Encoder Representations from Transformers (BERT)-based model. BERT-based models take in sequences of tokens (in some embodiments as one or more segments) with special tokens delimiting the sequence such as [CLS], $x_1, \ldots, x_N$, [EOS]. Other models could be used such as, for example, ROBERTA, random forest, bag of words, etc.

In some embodiments, the classifier 303 comprises a feed-forward neural network followed by softmax.

This model to be interpreted 300 processes input text such as " . . . very, very slow" to produce a representation z and label scores y. When presented with the same input, but the word "slow" masked, the model to be interpreted 300 produces outputs z' and y' respectively.

Figure 4:
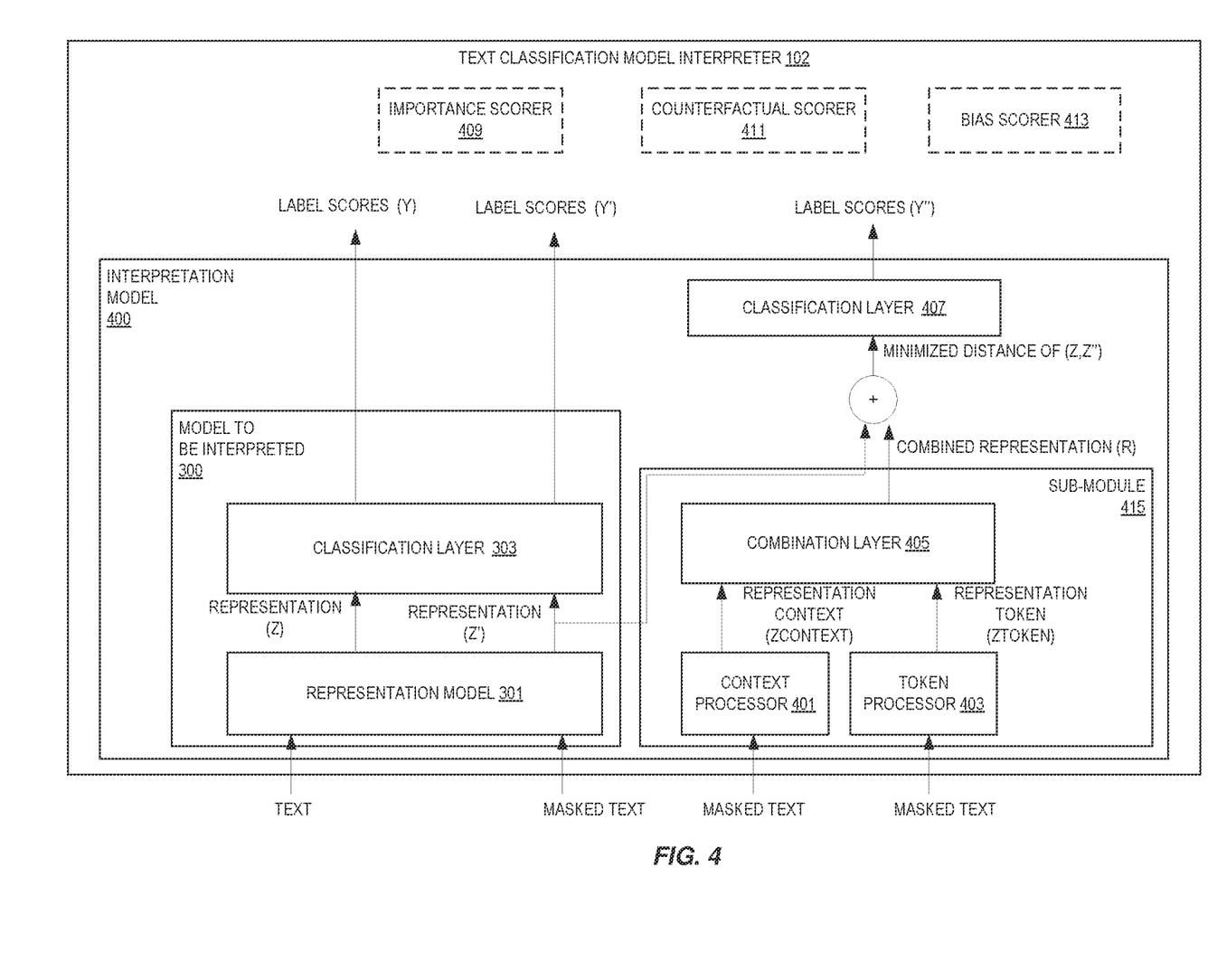
FIG. 4 illustrates embodiments of a text classification model interpreter.

FIG. 4 illustrates embodiments of a text classification model interpreter. This text classification model interpreter 102 interprets a model by using text that includes one or more words being masked (hereinafter masked text). As shown, embodiments of the text classification model interpreter 102 includes an interpretation model (g) 400 that at least includes aspects of the model to be interpreted (g) 300 of FIG. 2 and additional aspects.

As shown, the interpretation model 400 looks at both original text and masked text to generate one or more label scores. Additionally, the interpretation model 400 may generate one or more of an influence score for one or more words of the original text (or masked text), a counterfactual score for one or more words of the original text (or masked text), and/or a bias score for one or more words of the original text (or masked text).

Like FIG. 2, the representation model 301 generates a representation (z) of input text (x) such that z=M(x). The representation (z) is fed to a classifier (or classification layer) 303 which generates label scores (y=C(z)) for the text input (x).

A token mask mask$_i$ for the model to be interpreted 300 is used to create a masked input $x_{mask_t}^i$. The representation model 301 is also fed masked text ($x_{mask_t}^i$) which generates a representation (z') of the masked input text such that $z'_i = M(x_{mask_t}^i)$ The masked representation (z') is fed to a classifier (or classification layer) 303 which generates masked label scores (y'=C(z')) for the masked text input (x'). A label prediction may be obtained as the label with the highest score (l'=argmax(y')).

The text classification model interpreter 102 also includes a learned interpretation model (g) 415. As a proxy for the context-sensitive influence of a masked token xi, the learned interpretation model 415 is to model the difference in the representations generated by the representation model 301 for x and x' for a given token.

A sub-module (h) 415 includes a context processor (AC) 401 to process masked text to produce a context representation. In particular, with a token mask masks for the context processor 401, a masked input $x_{mask_s}^i$ is created for which the context processor 401 outputs a representation $z_{c,i} = A_C(x_{mask_s}^i)$. In some embodiments, the context processor 401 is a BERT-based model such as a trained Roberta-based model where the output is the mask token position is $z_{c,i}$. Note the mask token could be different between the model to be interpreted 300 and the context processor 401.

A token processor (AT) 403 processes the token which was masked to produce a representation $z_{t,i} = A_C(x_i)$. In some embodiments, a span is masked where $x_i$ denotes a span of tokens instead of a single token. In some embodiments, the token processor 403 is a BERT-based model such as a trained Roberta-based model where the output is the first token position of $z_{t,i}$.

A combination layer (AM) 405 combines the outputs from the content processor 401 and the token processor 403 to produces a representation. In particular, the sub-module 415 takes the input x and token location i to product output $r_i$ such that $r_i = h(x, i) = A_M(A_C(x_{mask_i}^i), A_T(x_i))$.

To product label productions, $z'_i$ is added to $r_i$ and fed to a classification layer (C) 407. In summary, learned interpretation model takes input x and token location i to make label predictions $y'_i$ where $y'_i = g(x, i) = C(z'_i + h(x, i)) = C(z'_i + r_i)$.

The sub-module 415 and learned interpretation model 415 provide token influence and label scores respectively. The parameters of the learned interpretation model 415 are learned, in some embodiments, by minimizing the mean square error between z and $z'^i$. In some embodiments, $A_M(z_{c,i}, z_{t,i}) = W_2(\tanh(W_1 z_{concat,i} + b_1)) + b_2$ and W1, b1, W2, and b2 are learnable parameters and $z_{concat}$ is the concatenation of $z_{c,i} + z_{t,i}$, $z_{c,i} - z_{t,i}$, and $z_{c,i} \times z_{t,i}$. Note that the multiplication is an element wise multiplication.

In some embodiments, the text classification model interpreter 102 includes an importance scorer 409. The importance scorer 409 determines which of the words from a segment of text are predicted to have the most importance. In some embodiments, the importance scorer 409 provides influence scores which are obtained from the predictions of the sub-module 415 where $r_i = h(x, i)$. In particular, softmax is applied to the output of the combination layer 405 to generate a plurality of scores ($s_i$) ($\hat{s}_i = $softmax $(C(r_i))$). The score may then be mapped to a range (such as [−1, 1] and the score with a positive label selected (where $s_i = 2 * \hat{s}_i$ [positive]+1). The sign of the score $s_i$ indicates the sentiment (positive or negative) and the magnitude indicates a strength.

Another type of score is an "unlike ratio." An unlike ratio gives an estimate of the ratio of words in the vocabulary which when used to replace a token leads to a different prediction. The described architecture allows for the pre-computation and storage token representations through the token processor (AT) for a large vocabulary and the evaluation of an impact each token in the vocabulary might have in a given context. For a vocabulary of words (V), for each word $w^j$ of V token embeddings ($E_V$) are pre-computed and stored such that $E_V^j = A_T(w^j)$. From those token embeddings and representations, the unlike ration $u_i$ can be computed as:

$$r_{V,i} = A_M(z_{c,i} E_V)$$

$$y_{V,i} = C(z + r_{V,i})$$

$$u_i = \frac{|\{w : w \in V, \mathrm{argmax}(y_{V,i}) \neq l\}|}{|V|}$$

When the unlike ratio for a given token is 0, then the model prediction is determined by the rest of the context. On the other hand, an unlike ratio close to 1 would indicate that the token is important for the predication and replacing it would likely change the prediction.

In some embodiments, the text classification model interpreter 102 includes a counterfactual scorer 411. A counterfactual score indicates what would be a good substitution to change the model's decision. In some embodiments, potential replacements are pre-computed and stored as outputs of the token processor 403. For example, subjecting a large dictionary to the token processor 403 to generate potential replacements.

For a given input and token within it, the context processor 401 is applied to the input text with the token removed to generate a context representation, the context representation and the pre-computed and stored results of the token processor 403 are then subjected to the combination layer 405, and the output of the combination layer 405 is then processed using a classification layer (such as the classification layer 407) to generate an estimate of how the interpretation model 400 would behave if the token in the input were to be replaced by any part in the vocabulary. As such, to generate potential counterfactuals, predictions from the sub-module 415 for all replacements are generated and ones with label predictions different from the model to be interpreted 300 are selected.

In some embodiments, the text classification model interpreter 102 includes a bias scorer 413. In some embodiments, context representations for a large dictionary of words with some word (token) removed are pre-computed and stored as outputs of the context processor 401, the removed token is subjected to the token processor 403 to generate a token representation, the context representations and the token representation are then subjected to the combination layer 405, and the output of the combination layer 405 is then processed using a classification layer (such as the classification layer 407) to generate an estimate of how the interpretation model 400 would behave if the token in the input were to be replaced by any part in the vocabulary. Specifically, predictions of what would lead to a negative prediction are determined. In some instances, pairwise queries, i.e., queries involving two words, reveal relative biases against a word compared to the other such as a control word and a probe word.

Note that one or more of the importance scorer 409, counterfactual scorer 411, and/or bias scorer 413 are routines to be called that invoke aspects of the interpretation model 400 to generate a score.

Figure 5:
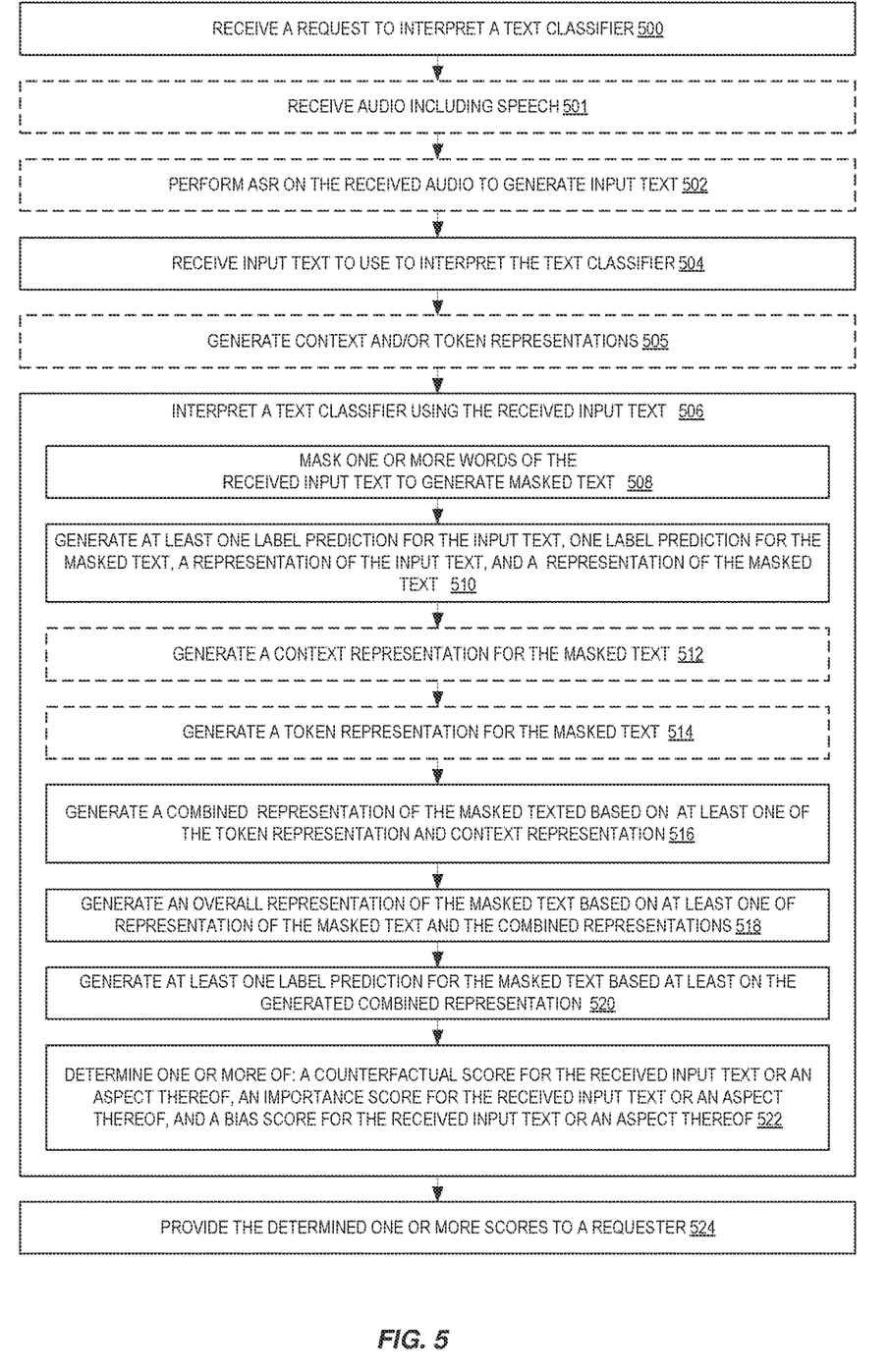
FIG. 5 is a flow diagram illustrating operations of a method for interpreting a text classifier according to some embodiments.

FIG. 5 is a flow diagram illustrating operations of a method for interpreting a text classifier according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by text classification model interpreter 102 of the other figures.

At 500 a request to interpret a text classifier is received. For example, the text classification model interpreter 102 may receive this request (or a frontend/orchestrator). The request may include several components including, but not limited to, one or more of: an indication of a location of text to use to interpret a text classifier, an indication of a sound file to use to interpret a text classifier (after speech recognition), text to use to interpret a text classifier, a sound file to use to interpret a text classifier (after speech recognition), an indication of what type of scoring is to be performed (importance, counterfactual, and/or bias), an indication of what vocabulary (dictionary) to use, an identification of a classification model to interpret, etc.

In some embodiments, audio including speech is received at 501. This audio is subjected to automatic speech recognition (ASR) at 502 to generate input text to use to interpret identified the classification model.

At 504 input text is received. In some embodiments, context representations and/or token representations for text are pre-computed and stored at 505. The received input text is used to interpret the identified classification model at 506. This interpretation may include several different acts.

One or more words of the received input text are masked to generate masked text at 508. For example, if the input text is "very, very slow" the word "slow" may be masked.

A label prediction for the input text, a label prediction for the masked text, a representation of the input text, and a representation of the masked text are generated using the identified classification model at 510.

In some embodiments, a context representation for the masked text is generated at 512. In some embodiments, token representation for the masked text is generated at 514. These representations are generated using one or more models such as BERT-based models.

A combined representation of the masked texted based on at least one of the token representation and context representation is generated at 516. This combined representation is generated using a combination layer such as combination layer 405.

An overall representation of the masked text is generated based on at least of one of the representation of the masked text and the combined representations of the masked text at 518.

Generate at least one label prediction for the masked text based at least on the generated combined representation at 520.

One or more of a counterfactual score for the received input text or an aspect thereof, an importance score for the received input text or an aspect thereof, and a bias score for the received input text or an aspect thereof are generated at 522. Details of how these scores are generated has been detailed above. In some embodiments, acts 514-522 are performed once and stored.

The determined one or more scores is provided to a requester at 524. Using these scores, the requester has better insight into how the model to be interpreted works.

Figure 6:
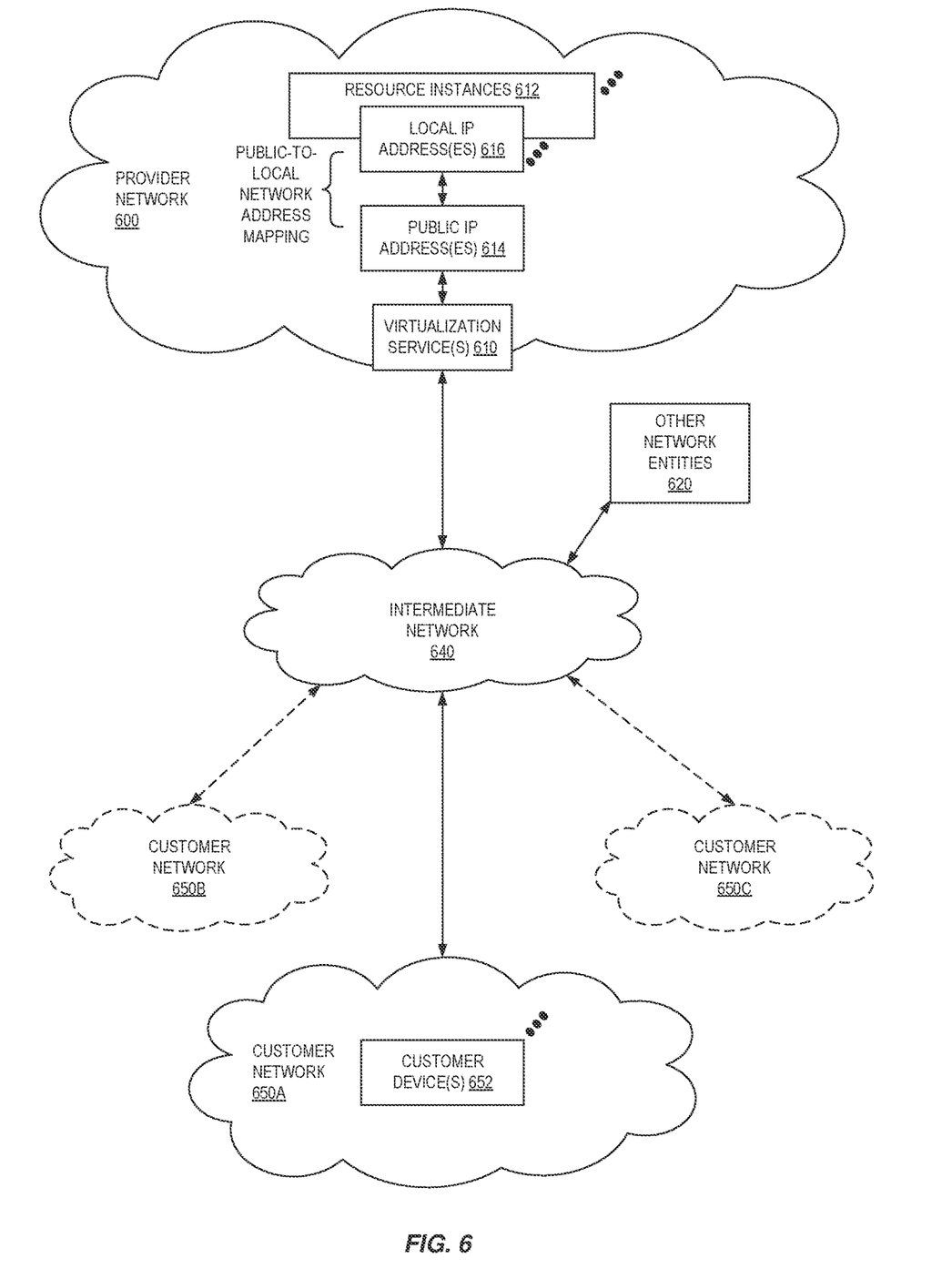
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
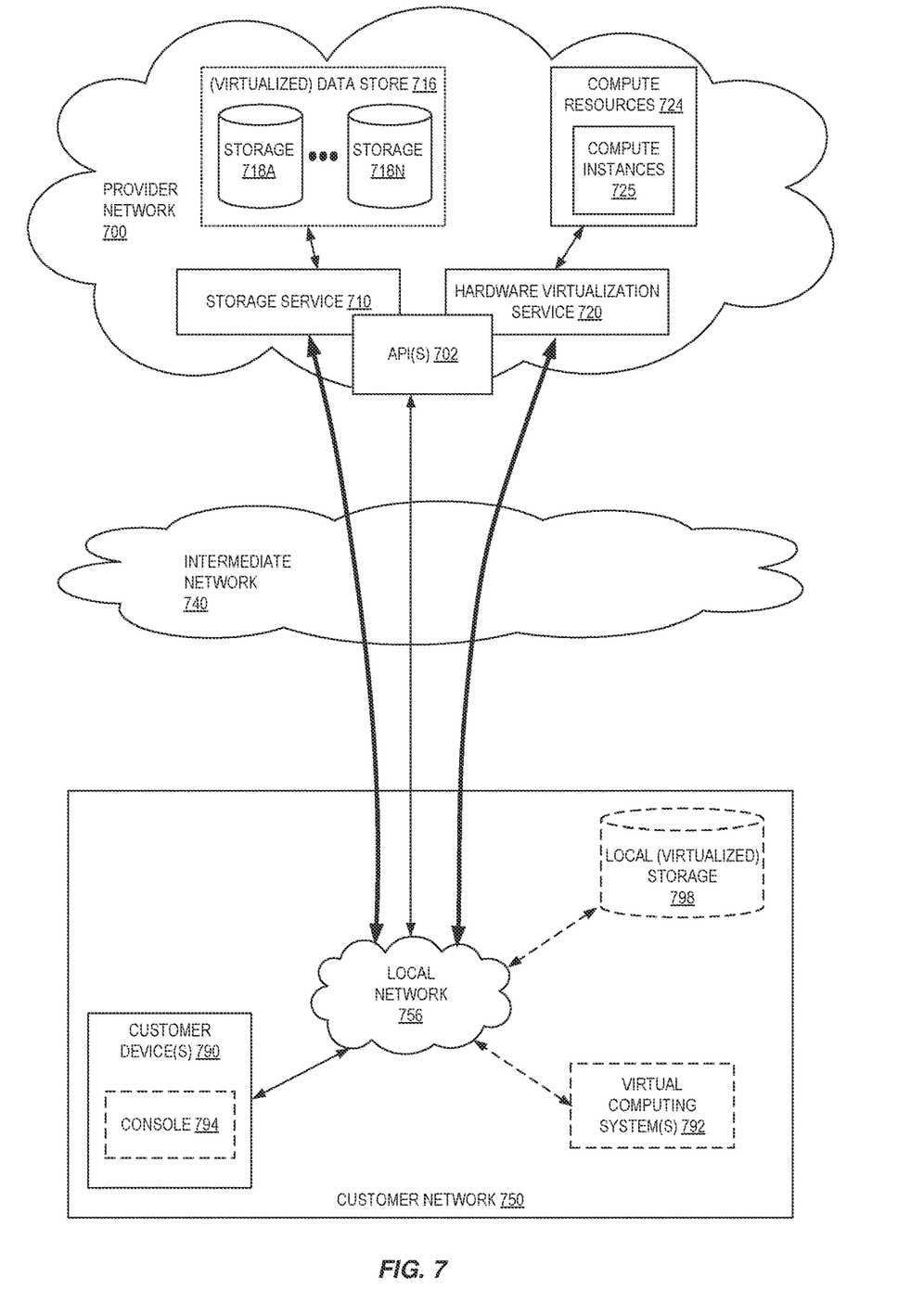
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
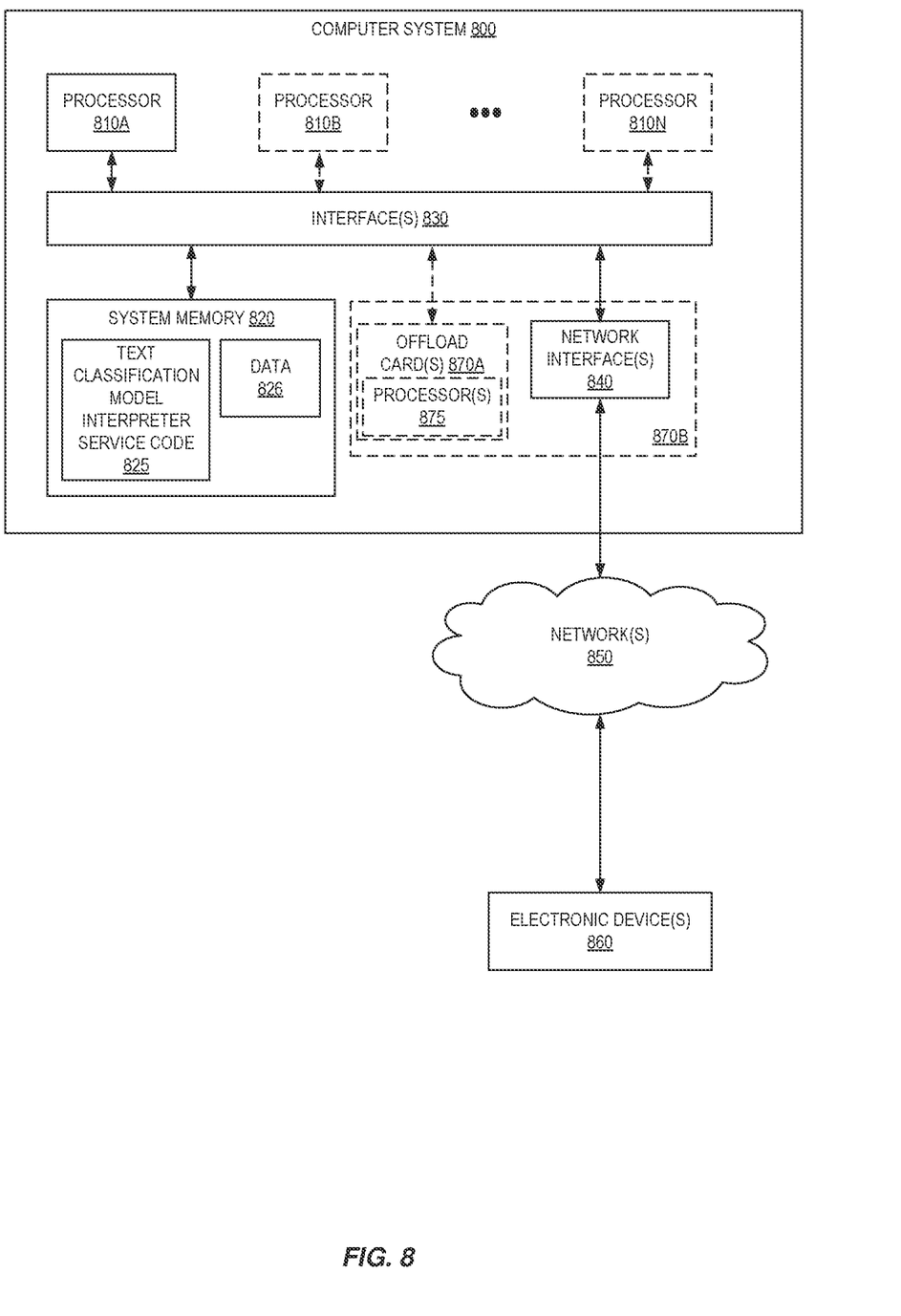
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as text classification model interpreter service code 825 (e.g., executable to implement, in whole or in part, the text classification model interpreter service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C. The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to interpret a text classifier;
   receiving input text to be used to interpret the text classifier;
   interpreting the text classifier using the input text by:
      masking a word of the input text to generate masked text,
      generating, using the text classifier, a representation of the input text, a representation of the masked text, at least one label prediction for the representation of the input text, and at least one label prediction for the representation of the masked text,
      generating a context representation for the masked text,
      generating a token representation for the masked text,
      combining the token representation for the masked text and the context representation for the masked text using a combination layer to generate a combined representation of the masked text,
      generating an overall representation of the masked text by adding the representation of the masked text and the combined representation of the masked text,
      generating at least one label prediction for the masked text based on the overall representation of the masked text,
      determining, using the overall representation of the masked text and one or more of the label predictions, one or more of: a counterfactual score for the input text, an importance score for the input text, or a bias score for the input text, and
      providing the one or more scores to a requester.

2. The computer-implemented method of claim 1, wherein the request includes one or more of: an indication of a location of text to use to interpret the text classifier, an indication of a sound file to use to interpret the text classifier, text to use to interpret the text classifier, a sound file to use to interpret the text classifier, an indication of what type of scoring is to be performed, an indication of what vocabulary to use, or an identification of the text classifier to interpret.

3. The computer-implemented method of claim 1, wherein the representation of the input text and the representation of the masked text are generated using a representation model of the text classifier, and wherein the at least one label prediction for the representation of the input text and the at least one label prediction for the representation of the masked text are generated using a classification layer of the text classifier.

4. A computer-implemented method comprising:
   receiving a request to interpret a text classifier;
   receiving input text to be used to interpret the text classifier;
   generating masked text from the input text;
   generating a representation of the input text and a representation of the masked text;

generating a label prediction for the representation of the input text and a label prediction for the representation of the masked text;
generating a context representation for the masked text;
generating a token representation for the masked text;
combining the context representation for the masked text and the token representation for the masked text to generate a combined representation of the masked text;
generating an overall representation of the masked text by combining the representation of the masked text and the combined representation of the masked text;
generating a label prediction for the masked text based on the overall representation of the masked text;
determining, using the overall representation of the masked text and at least one of the label predictions, at least one of: a counterfactual score for the input text, an importance score for the input text, or a bias score for the input text; and
providing the at least one score to a requester.

5. The computer-implemented method of claim 4, wherein combining the context representation for the masked text and the token representation for the masked text uses a combination layer.

6. The computer-implemented method of claim 5, wherein the combination layer operates on a concatenation of the context representation for the masked text and the token representation for the masked text.

7. The computer-implemented method of claim 4, further comprising generating an influence score by at least performing a softmax operation on the overall representation of the masked text.

8. The computer-implemented method of claim 4, further comprising generating an influence score by at least determining an unlike ratio that is an estimate of a ratio of words in a vocabulary that when used to replace a token leads to a different prediction from the text classifier.

9. The computer-implemented method of claim 4, further comprising generating a bias score, for a masked word by combining a token representation for the masked word with context representations for words of a dictionary, and subjecting the combinations with a classification layer.

10. The computer-implemented method of claim 4, further comprising generating a counterfactual score, for a masked word by combining a context representation for the masked word with token representations for words of a dictionary, and subjecting the combinations with a classification layer.

11. The computer-implemented method of claim 4, wherein a mask for the masked text spans a plurality of tokens.

12. The computer-implemented method of claim 4, wherein the text classifier utilizes a bidirectional encoder representations from transformers model.

13. The computer-implemented method of claim 4, wherein the request includes one or more of: an indication of a location of text to use to interpret the text classifier, an indication of a sound file to use to interpret the text classifier, text to use to interpret the text classifier, a sound file to use to interpret the text classifier, an indication of what type of scoring is to be performed, an indication of what vocabulary to use, or an identification of the text classifier to interpret.

14. The computer-implemented method of claim 4, wherein providing the at least one score to a requester further comprises transforming the at least one score into a textual explanation.

15. A system comprising:
a first one or more electronic devices to implement a storage service in a multi-tenant provider network, the storage service to store a text classifier; and
a second one or more electronic devices to implement a text classification model interpreter service in the multi-tenant provider network, the text classification model interpreter service including instructions stored in memory that upon execution by one or more processors cause the text classification model interpreter service to:
receive a request to interpret the text classifier;
receive input text to be used to interpret the text classifier;
generate masked text from the input text;
generate a representation of the input text and a representation of the masked text;
generate a label prediction for the representation of the input text and a label prediction for the representation of the masked text;
generate a context representation for the masked text;
generate a token representation for the masked text;
combine the context representation for the masked text and the token representation for the masked text to generate a combined representation of the masked text;
generate an overall representation of the masked text by combining the representation of the masked text and the combined representation of the masked text;
generate a label prediction for the masked text based on the overall representation of the masked text;
determine, using the overall representation of the masked text and at least one of the label predictions, at least one of: a counterfactual score for the input text, an importance score for the input text, or a bias score for the input text; and
provide the at least one score to a requester.

16. The system of claim 15, wherein the text classification model interpreter service includes further instructions stored in the memory that upon execution by the one or more processors further cause the text classification model interpreter service to generate an influence score by at least determining an unlike ratio that is an estimate of a ratio of words in a vocabulary that when used to replace a token leads to a different prediction from the text classifier.

17. The system of claim 15, wherein the text classification model interpreter service includes further instructions stored in the memory that upon execution by the one or more processors further cause the text classification model interpreter service to generate a bias score for a masked word by combining a token representation for the masked word with context representations for words of a dictionary, and subjecting the combinations with a classification layer.

18. The system of claim 15, wherein the text classification model interpreter service includes further instructions stored in the memory that upon execution by the one or more processors further cause the text classification model interpreter service to generate a counterfactual score for a masked word by combining a context representation for the masked word with token representations for words of a dictionary, and subjecting the combinations with a classification layer.

19. The system of claim 15, wherein a mask for the masked text spans a plurality of tokens.

20. The system of claim 15, wherein the request includes one or more of: an indication of a location of text to use to interpret the text classifier, an indication of a sound file to use to interpret the text classifier, text to use to interpret the text classifier, a sound file to use to interpret the text classifier, an indication of what type of scoring is to be performed, an indication of what vocabulary to use, or an identification of the text classifier to interpret.

\* \* \* \* \*